Reissued Aug. 29, 1933 Re. 18,930

UNITED STATES PATENT OFFICE 18,930

REFINING LEAD

Philip W. Davis, Cambridge, Mass.

No Drawing. Original No. 1,809,835, dated June 16, 1931, Serial No. 85,031, January 30, 1926. Renewed October 30, 1930. Application for reissue April 13, 1933. Serial No. 665,953

9 Claims. (Cl. 75—15)

The present invention relates to an improvement in refining lead.

The object of the invention is to produce an improved method of refining lead alloys, and particularly scrap storage battery plates. To this end the present invention consists in the method hereinafter described and particularly defined in the claims.

A specific embodiment of the present invention will be described. Scrap storage battery plates consist of grids of lead-antimony alloy, and with these plates are ordinarily found pieces of wood and rubber and in the interstices of the grids or plates are found the lead salts, particularly lead sulphate and various oxides of lead. The scrap plates are thrown into a rotary furnace, that is to say, a cylindrical furnace lined with a basic lining such as magnesite, having ends which are drawn in toward axial openings. After the scrap lead is inserted in the furnace, the latter is rotated through 30° to 50° of arc so as to tip the contents up in an inclined position at one side of the furnace. The contents of the furnace are then heated by a flame introduced at one end. An oil flame is used for this purpose and the contents of the furnace melt, that is to say, the battery plate grids and the litharge melt, and inasmuch as they are in bodies of small dimensions, and both in molten condition, the litharge takes up antimony from the lead. The lead collects in a pool at the bottom of the furnace, with a layer of molten litharge on top. There may be various other lead salts present, but in any event the litharge is present, and the operation results in refining the lead-antimony alloy by the absorption of the antimony from the particles of alloy as they melt and trickle down over and through the mass of materials piled in the furnace and pass through the layer of molten litharge on top of the pool of lead at the bottom. The temperature at which this operation is carried on is above the melting point of antimonial litharge, and the pool of lead produced is very completely deprived of its antimony content. In fact, the lead produced according to this process may contain as small a quantity of antimony as .003% or less. This pure lead is drawn off by rotating the furnace upon its axis to bring the tap hole below the level of the pool of lead.

While a rotary form of furnace has been described, the form of furnace is not material to practicing the method herein described, as the method may be practiced in different forms of furnaces. Thus, for example, it may be practiced in a furnace in which the material is dumped in at a side and falls in an inclined pile along the side of the furnace. Then the pool of lead produced in the operation forms in the bottom of the furnace and may be drawn off through a tap hole at the end of the furnace.

The operation to this point is a species of the method patented in my Patent No. 1,566,078, dated December 15, 1925.

After the soft lead thus produced has been drawn off, the furnace is rotated to raise the tap hole above the level of the molten litharge contained therein, and some coal or other reducing material is thrown into the furnace and the heating continued to reduce the lead contained in the litharge. For removing sulphur some scrap iron may be introduced at this time. This reduction takes place in a reducing or neutral atmosphere preferably, and the lead produced forms in a pool in the bottom of the furnace, and after the operation is carried on to the desired extent, that is, to an extent sufficient to smelt the greater part of the lead-antimony alloy from the contents of the furnace to metal, the furnace is again rotated to bring the tap hole below the level of the pool of lead-antimony alloy, and that alloy is then drawn off. Under good conditions this alloy will be approximately 7% antimony and 93% lead, depending somewhat on final recovery. This, therefore, produces a lead-antimony alloy richer in antimony than would be produced by the direct smelting of battery plates.

The present invention may be used in refining drosses. For example, type metal drosses and Babbitt metal drosses which consist of alloys of lead, tin and antimony and their oxides, may be refined according to the present method, and may thus be divided into two metallic products, one carrying more tin and antimony than the other. The refined metal collects in the bottom of the furnace, and after the operation has been carried on a sufficient length of time to melt all of the charge in the furnace, the latter, in case of a rotary furnace, will be turned to bring the tap hole of the furnace below the level of the melted alloy so that it may be drawn off, the remaining melted oxide and slag is treated with a reducing agent and the alloy present smelted out of it.

In the refining operation which takes place in the furnace we have as much litharge as is found in the plates for use in the removal of the antimony less what may be reduced to lead by the wood separators, rubber, etc. The grids which contain the antimony and carry from 6% to 8% of it, according to the make of the battery, are intimately mixed with the litharge and they begin to give up their antimony to it as soon as enough heat reaches them to melt the lead. Meanwhile the litharge itself is also melting and collects at the bottom of the furnace, care being taken so to dispose the charge as above described that there is room at the bottom for it to collect. Then the little streamlets of melted lead which still contain antimony plunge through this melted litharge into the pool of lead on which the litharge floats, and they give up more antimony as they pass through it. The purity of the lead can be made anything one desires by carrying the mixing of the lead with the litharge to a greater extent than is possible by simply allowing it to gravitate to the bottom of the furnace, as by stirring or agitating the pool of lead and litharge after all of the charge is melted. This will bring the litharge and lead into intimate contact in bodies of small dimensions, and result in the removal of more or less antimony. One may run off both lead and litharge and return the litharge to the furnace, or to another furnace, to smelt it.

The mere running off of the lead and litharge together results in substantial additional purification, thus it has reduced the antimony content from .086 to .048 per cent.

This process further commends itself because instead of producing 7% antimonial lead as one of the principal products, one might produce an alloy carrying a much higher percentage of antimony, and in cases where this is desirable, one could effect it by introducing a measured amount of reducing agent which, by reducing the lead out of the litharge, would concentrate the antimony in the litharge, thereby securing a higher percentage of antimony in the second product, (to wit, lead-antimony alloy smelted from the antimonial litharge).

The antimony content recovered in the second product may be graduated by the amount of litharge introduced; in other words, this method permits the partial and measured extraction of antimony.

The present method contemplates in one aspect the refining of alloys containing lead tin antimony and copper by mixing litharge with the alloy and melting the two together and exposing them to each other in bodies of small dimensions so as thereby to oxidize and incorporate in the litharge a portion (the amount depending on the ratio of litharge used to alloy) of the alloy metals contained in the original alloy, leaving a lead alloy with a greater content of lead than the original alloy charged, then skimming or otherwise removing from the furnace the litharge containing alloy metals extracted from the original alloy charged, and placing in the furnace fresh litharge, repeating the heating process to secure a second partial refining of the charge, and a second product of litharge carrying alloy metals (the amount depending on the ratio of litharge used to alloy remaining), and repeating this process as often as desired to obtain a plurality of mixtures by smelting the various litharges obtained to metal.

Having thus described the invention, what is claimed is:

1. The method of refining scrap storage battery plates which consists in introducing the scrap material into a furnace, heating the material in the furnace whereby the lead alloy and the lead oxides contained in the battery plates are melted in intimate contact with each other in small masses, and flow downward into the bottom of the furnace, continuing this heating process until a body of refined lead containing but a small percentage of antimony is collected, drawing off such purified lead thus recovered, introducing reducing material into the furnace, heating the contents to smelt the lead and antimony content of the lead oxides into a lead-antimony alloy comparatively high in antimony, and in drawing off the lead-antimony alloy thus produced.

2. The method of refining scrap storage battery plates which consists in introducing the scrap into a furnace, melting the scrap, drawing off the molten materials consisting principally of refined lead and litharge carrying antimony, the litharge acting to refine the lead during the melting of the scrap and to further refine it during the flowing of the molten materials out of the furnace; separating the litharge from the lead and smelting the litharge to recover a lead antimony alloy therefrom.

3. The method of refining scrap lead alloy which consists in introducing the scrap into a furnace, melting the scrap in an oxidizing flame which produces litharge from part of the lead content of the alloy and refines the alloy as it melts into two products, one an alloy carrying a part of the alloy metals and the other litharge carrying the remainder of the alloy metals, and smelting the latter product to lead alloy containing a different percentage of the alloy metals.

4. The method of smelting antimonial litharge which consists in introducing it into a furnace, adding less than enough reducing material to bring about complete reduction, subjecting it to the action of heat, whereby two products carrying different amounts of antimony are produced, one of which would be a lead-antimony alloy poorer in antimony than would be produced by the complete reduction of antimonial litharge, and the other of which would be a slag consisting of the remainder of the metal oxides in the charge.

5. The method of refining alloys containing lead, tin, antimony and copper, which consists in mixing litharge with the alloy, melting the alloy and litharge together, and exposing them to each other in bodies of small dimensions so as thereby to oxidize and incorporate in the refining litharge a portion (depending on the ratio of litharge to alloy) of the alloy metals contained in the alloy, leaving a lead alloy with a greater content of lead than the original alloy charged, and subsequently smelting the remaining mass to obtain an alloy containing the alloy metals and a smaller lead content than the original charge.

6. The method of refining scrap storage battery plates which consists in introducing the scrap into a furnace, melting the scrap together with a measured amount of reducing agent which, added to and taken together with the reducing agent naturally found with scrap plates, is still insufficient for completely smelting all of the plates to metal, and thereby producing a greater amount of refined lead than would be the case were no additional reducing agent used, and at the same time producing less antimonial litharge with a higher antimony content.

7. The method of refining scrap storage battery plates which may include some reducing material such as wood and rubber, which consists in melting down the scrap comprising both grids and lead oxide in the presence of sufficient reducing agent in addition to that found with them to reduce lead out of the oxide and thereby to control the proportions of soft lead and lead oxide and antimony oxide and producing a pool of melted lead containing little antimony and covered by oxide, agitating the pool to expose the lead to the oxide and thereby further transfer antimony from the lead to the oxide until any desired degree of softness of the lead is attained.

8. The method of refining scrap storage battery plates, drosses, and the like, containing lead-antimony alloy and oxide inherently intermingled, which consists in melting the entire mixture of metal and oxide in the absence of substantially any reducing agent above that which may be originally present in the mixture, the oxide acting to refine the lead by taking up the antimony from the particles of alloy as they melt and as they percolate through the molten oxide, collecting the refined lead in a pool, and separating the antimony-bearing oxide from the lead.

9. The method of refining scrap storage battery plates, drosses, and the like, containing lead-antimony alloy and oxide inherently intermingled, which consists in melting the entire mixture of metal and oxide in the absence of substantially any reducing agent above that which may be originally present in the mixture, the oxide acting to refine the lead by taking up the antimony from the particles of alloy as they melt and as they percolate through the molten oxide, running the molten materials together in a stream to cause further refinement of the lead by contact with oxide, collecting the refined lead in a pool, and separating the antimony-bearing oxide therefrom.

PHILIP W. DAVIS.